United States Patent [19]

Klimmer

[11] 4,253,471
[45] Mar. 3, 1981

[54] CLEANING SHOE FOR A COMBINE HARVESTER

[75] Inventor: Josef W. Klimmer, Zweibrücken, Fed. Rep. of Germany

[73] Assignee: Deere & Company, Moline, Ill.

[21] Appl. No.: 54,735

[22] Filed: Jul. 5, 1979

[30] Foreign Application Priority Data

Jul. 8, 1978 [DE]  Fed. Rep. of Germany ....... 2830163

[51] Int. Cl.³ ............................................. A01D 41/12
[52] U.S. Cl. ........................... 130/22 R; 130/DIG. 1; 130/24
[58] Field of Search ................... 130/21, 22 R, 24, 25, 130/23, DIG. 11; 209/344, 345, 308, 365 R

[56] References Cited

U.S. PATENT DOCUMENTS

| | | | |
|---|---|---|---|
| 2,811,972 | 11/1957 | Kline | 130/25 |
| 3,236,387 | 2/1966 | Poynter | 209/344 |
| 3,347,373 | 10/1967 | Dahlberg | 209/365 R |
| 3,603,063 | 9/1971 | Stroburg | 130/24 |
| 4,076,124 | 2/1978 | Taysom et al. | 209/308 |

*Primary Examiner*—Robert A. Hafer

[57] ABSTRACT

In a cleaning shoe for a combine harvester, threshed grain from the threshing cylinder and separator is received onto the upper run of an endless mesh belt conveyor or sieve band. The sides of the upper run of the conveyor are guided in channels which may be oscillated in a vertical plane so as to agitate the upper run of the sieve band and promote the separation of grain from material other than grain as the material is conveyed rearwardly, the grain passing downwards through openings in the mesh belt. A second more conventional oscillating sieve element is mounted below the sieve band. Grain cleaning efficiency is augmented by a blower and duct system which provides a plurality of longitudinally spaced, laterally extending elongated air nozzles disposed below the lower sieve element and each directing an air blast rearwardly and upwardly through it. In an alternate embodiment, a third conventional sieve element is supported to move with the guide of the upper run of the sieve band so that it too is oscillated. Discharge from the rearward edge of this third sieve element is received by a supplementary tailings conveyor.

12 Claims, 5 Drawing Figures

CLEANING SHOE FOR A COMBINE HARVESTER

BACKGROUND OF THE INVENTION

This invention relates to a cleaning shoe for a combine harvester and more particularly to an improved cleaning shoe having an upper sieve element providing for positive conveying of crop material as well as oscillation and a blower system providing longitudinally spaced air blasts over the length of the underside of a lower sieve element.

It is known to oscillate at least the upper run of a sieve belt normal to the plane of the belt to further assist in the separation. For example, German Pat. No. 2,015,584 discloses an oscillating pronged belt shaker for separating grain from stalk and leaf material in a combine harvester, with prongs which are arranged on prong carriers and which are oscillated for shaking out the grain and straw by self-excitation or by means of positive excitation. For this purpose, rollers are disposed above the upper run, which rollers may also be of elliptical configuration. This causes the upper run which is driven by conveyor rollers also to be displaced in a vertical direction.

SUMMARY OF THE INVENTION

An object of the present invention is to increase the efficiency of cleaning in relation to the surface area of the screen belt which is oscillated, while providing for precise guiding.

According to the present invention, there is provided a cleaning device for a combine harvester, having a screen or mesh belt (sieve band) which receives threshed material from a threshing and separating rotor and which includes an upper and a lower run and through which air is blown by a blower, wherein the upper run runs through a guide structure which is connected to an oscillating drive arrangement which moves the guide structure and the belt guided thereby normal to the plane of the belt.

This arrangement makes it possible for even long screen belts to be satisfactorily guided and for the screen belts to be oscillated in a vertical direction, in addition to any horizontal component of movement, without thereby detrimentally affecting the screen belt or the movable parts of the cleaning device. For this purpose, it is advantageous for the guide structure to be pivotally connected to rocking arm which are oscillated. The guide structure moves over an arcuate path and the upper run is caused to oscillate. As the rocking arms are advantageously pivoted intermediate their ends, an additional screen can also be pivoted in a simple manner on the rocking arms, which additional screen moves, at any one time, in the opposite direction with respect to the guide of the upper run.

A second screen may be connected to the rocking arms below their pivot locations, and a third screen may be connected to the rocking arms between the two runs of the belt. By virtue of this arrangement, the efficiency in relation to surface area of the cleaning device can be substantially increased and thus the cleaning device can be made narrower than for example the threshing and separating device, in particular the threshing and separating device which operates on the axial flow principle. In addition, this arrangement provides that the overall structural height is kept substantially less than hitherto, as the cleaning device requires less room than previously. It is also advantageous for the lower run of the sieve band to be guided in a stationary guide member.

In accordance with the invention, a cleaner blower associated with the cleaner may have two longitudinal blower passages which are arranged at a spacing from each other and which are disposed in the region of the outer side boundary of the sieve elements and to which there are connected numerous nozzles which blow air upwards through a screen or sieve and/or the screen belt. This arrangement provides for even more effective cleaning of the crop material, while at the same time the specific capacity may be increased. With this arrangement, it is also possible to use extremely long screen belts or screens in the cleaning device, with air being uniformly blown onto the screen belts or screens over their entire length, without an air pressure drop occurring in the region of the rearward end of the screen as in conventional cleaning shoes. For this purpose, it is advantageous for the nozzles to extend over the entire width of the run, a uniformly good supply of air being obtained over the entire area of the cleaning device, without fluctuations in air pressure occurring. For this purpose, it is advantageous for each side blower passage or plenum to be supplied with air by way of a separate cleaning blower.

It is also advantageous for the nozzles to interconnect the side blower passages which extend parallel to each other, and to have lateral inlet openings which are connected to the blower passages, wherein the nozzles and the side blower passages form a self-supporting structural unit.

It is advantageous for a cleaning shoe according to the invention to be provided below a threshing and separating device which operates on the axial flow rotary principle. The compact, space-saving arrangement of the cleaning device is particularly suitable in such an application. As these combine harvesters have a substantially higher specific crop throughput in relation to separator volume than conventional combine harvesters with reciprocating straw walker separators, it is desirable for the efficiency in relation to surface area of the cleaning device to be substantially increased. In this respect, it is advantageous that a plurality of screens which are adapted to the length of the rotary threshing device can be provided below the threshing device. This is achieved by virtue of the screens being moved with an oscillating motion and at the same time having air blown thereonto over their entire surface. A further increase in the efficiency of the cleaning device is possible in that the second screen may be extended beyond the length of the screen belt. It is advantageous for the air nozzle to have a transverse nozzle slot, with the flow of air issuing from the nozzles inclined upwards. As the two runs of the belt produce a cleaning action, an oscillating motion may also be imparted to a guide structure for the lower run. Both guide structures may be pivotally connected to the rocking arms.

DESCRIPTION OF THE PREFERRED EMBODIMENT

Figure 1:
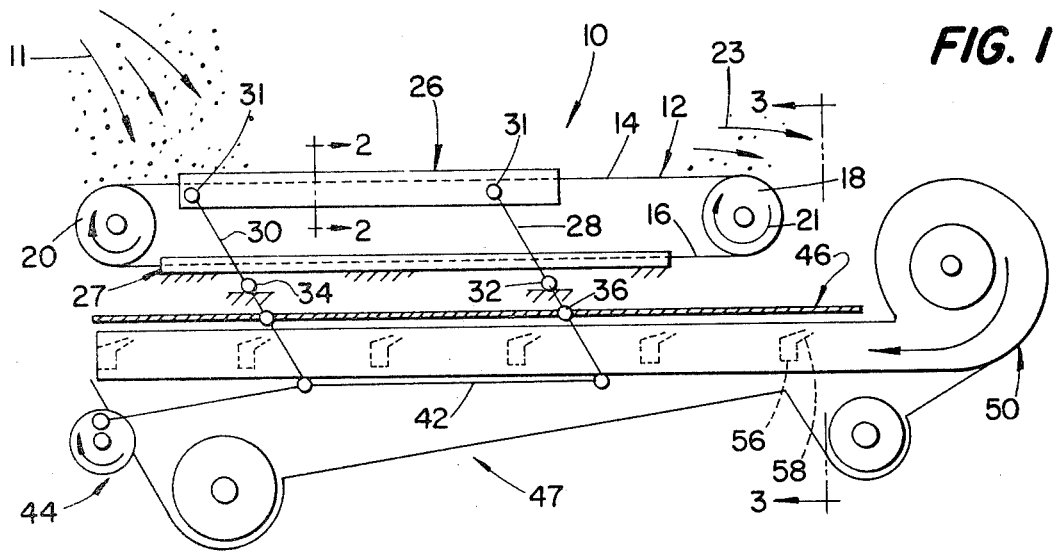
FIG. 1 is a diagrammatic side view of a cleaning shoe embodying the invention.
Figure 2:
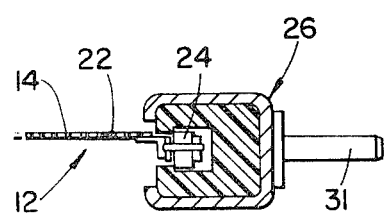
FIG. 2 is an enlarged partial sectional view on line 2—2 of FIG. 1 showing an edge of the upper run of the sieve band guided in an oscillating guide member.

FIG. 1 shows a cleaning shoe 10 embodying the invention, for use in a combine harvester. Threshed and separated grain is delivered as is conventional to a forward portion of the shoe as indicated by arrows 11. The cleaning shoe 10 is provided with a substantially horizontally extending screen belt or sieve band 12 which comprises an upper run 14 and a lower run 16. The screen belt 12 is trained around a front driven roller 18 and a rear roller 20 and driven in the direction shown by arrow 21 by conventional means (not shown). It is also possible for the rear roller 20 to be driven. The screen belt 12 forms a first screen and is provided in its surface with numerous, uniformly distributed foramina or through openings 22 (see FIG. 2) through which partially cleaned crop material can pass while remaining material, including straw and chaff is passed to a discharge opening (not shown) by way of the screen belt as indicated by arrow 23. The screen belt 12 is provided at its sides with rollers 24 which are connected by way of link members and which are received in upper and lower guide members 26 and 27 respectively.

Upper and lower guide members 26 and 27 are provided on both sides of the screen belt 12. The guide members may be formed, for example, as U-shaped supports and may comprise either metal or, because of its better anti-friction properties, a plastics material at least internally as indicated in the drawings. The two lower guide members 27 which are disposed opposite each other are fixedly connected to fixed side members of the cleaning shoe and guide the lower run 16 horizontally so that the screen belt can be smoothly driven by way of the driven roller 18. The lower guide members also prevent resonant oscillations of the lower run 16 and ensure that the run is properly guided, particularly when the axial distance between the rollers is very great. The upper run 14 is also received in upper guide members 26 which can be shorter than the lower guide members 27 so that they can be axially displaced during oscillation between the rollers 18 and 20. The upper guide members 26 are connected near their ends to rocking arms 28 and 30 by way of pins 31. The rocking arms 28 and 30 are each pivoted in the region of their centre to fixed side members of the cleaning shoe by way of respective pivots 32 and 34. The rocking arms 28 and 30 are arranged relative to each other in such a way that they can be reciprocated in a parallelogram-like manner, with the upper guide members 26 moving over an arcuate path which is determined by the radius of the rocking arms 28 and 30. The lower ends 38 and 40 of the rocking arms 28 and 30 are connected together by way of a link 42 which is connected to a crank drive 44 by means of which the rocking arms 28 and 30 can be oscillated. The rocking arms 28 and 30 on one side of the shoe can be connected by way of transverse struts (not shown) to the rocking arms which are disposed on the other side so that all are driven together.

A second screen or sieve element 46 is disposed below the mounting locations 32 and 34 for additional cleaning of the crop material. The screen is pivotally connected to the rocking arms 28 and 30 by way of laterally projecting pivots 36 so that the second screen is moved instantaneously in the opposite direction to the upper guide members 26 and thus produces a further, even more intensive crop cleaning action. The second screen 46 may be formed conventionally from a screen lattice with a large number of openings therethrough. Clean grain and tailings are received conventionally below the shoe in a pan and conveyor arrangement 47 including a forward clean grain conveyor and rearward tailings conveyor, as indicated in FIG. 1.

Figure 5:
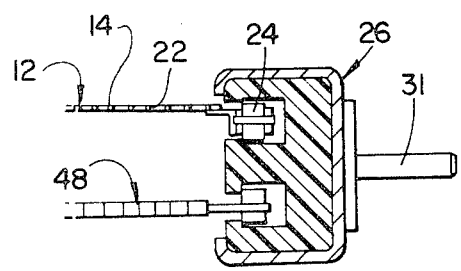
FIG. 5 is an enlarged partial cross sectional view similar to FIG. 2 on line 5—5 of FIG. 4 showing the arrangement of the upper run of the sieve band and an additional sieve element immediately below it in the oscillating guide member.

In an alternate embodiment, a third screen 48 may be pivotally connected to the rocking arms 28 and 30 or to the upper guide members 26, as shown in FIG. 5, between the two runs 14 and 16. In this embodiment, a supplementary tailings conveyor 49 may be employed. The through openings in the several screens decrease in size towards the bottom.

Figure 3:
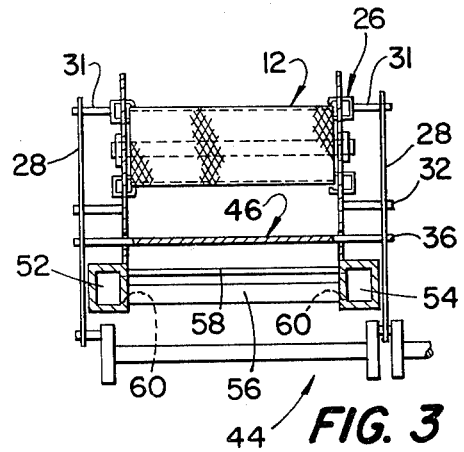
FIG. 3 is a cross-sectional view on line 3—3 of FIG. 1 showing the disposition of the blower side passages and transversely extending air nozzles beneath the cleaner sieves.
Figure 4:
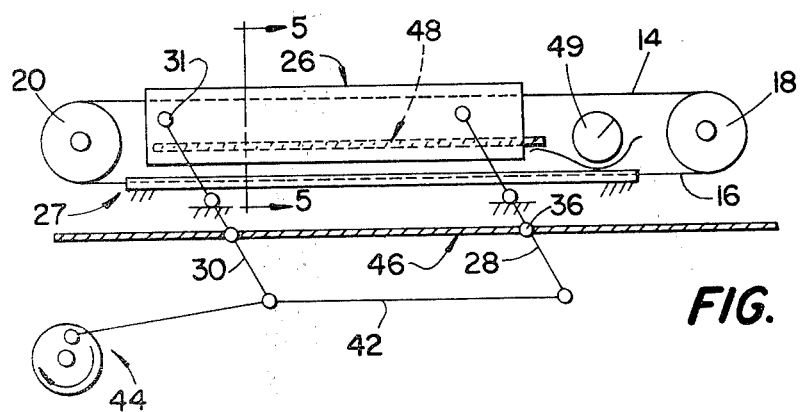
FIG. 4 is a view similar to FIG. 1 shows an alternate embodiment including an additional sieve element between the upper and lower runs of the sieve band.

Disposed below the second screen 46 is a cleaning blower 50 which can be in the form of an axial blower and which is connected to two longitudinally extending side blower passages or plenums 52 and 54 which are disposed with a horizontal spacing therebetween and outside of the outer side boundary of the screen belt 12 or the screen 46. Instead of the single cleaning blower 50, each blower passage may also be provided with a separate cleaning blower (not shown). Disposed between the two blower passages 52 and 54 are numerous transverse nozzles 56 which are disposed at spacings from each other and which are provided with an outlet opening or a nozzle slot 58 directing air rearwardly and upwardly. At their ends, the nozzles 56 have inlet openings 60 which are connected to the blower passages 52 and 54. In this way, the nozzles 56 are uniformly supplied with air at both ends, so that a uniform distribution of air below the screen 46 and the screen belt 12 can be achieved. The nozzle bodies are so constructed that they also serve as connecting struts between the blower passages 52 and 54 and thus form a rigid, self-supporting frame which may act as a main frame or chassis for the cleaning shoe as indicated in FIG. 3.

The nozzles 56 which are arranged transversely with respect to the plane of movement of the crop material extend parallel to each other and can also be provided with inlet openings at the front or underside, for receiving fresh air.

With the present invention, a very good crop cleaning action may be achieved with a relatively long and narrow cleaning shoe making it particularly adaptable for use below and in longitudinal alignment with an axial flow rotary threshing and separating device.

Instead of the crank device 44 for driving the rocking arms 28 and 30 and thus for producing the horizontal and vertical movement of the guide members 26, other forms of drive means could be used. For example, it is possible for the guide members 26 to be moved in vertical and horizontal planes by means of hydraulic motors, in order thereby to produce an oscillating motion at the upper run 14. The lower run 16 shown in the embodiment is normally guided in the stationary guide members 27. However, it is also possible for the lower guide members 27 to be connected to the rocking arms 28 and 30 so that the lower run 16 can also be moved with an oscillating motion.

I claim:

1. A cleaning shoe for processing crop material received from the threshing and separating mechanisms of a combine harvester comprising:

a frame;

spaced apart upstream and downstream conveyor rollers supported by the frame;

an elongated endless foraminous belt trained around the rollers so as to define an approximately horizontal upper run and a lower run beneath the upper run, the upper run being disposed so as to receive crop material from the threshing and separating mechanism of the combine;

drive means for rotating at least one of the rollers so that the upper run of the belt moves in a downstream direction;

oscillating means supported by the frame for engaging and agitating a portion of the upper run as the upper run is moving in a downstream direction, including a pair of elongated guides extending between the rollers and engaging the opposite sides of the belt and having ends spaced from the rollers so as to permit a longitudinal component of oscillation of the guides; and blower means supported by the frame for directing air generally upwards and downstream so that at least a portion of the air passes through the upper and lower runs of the belt.

2. The invention defined in claim 1 wherein the oscillating means further includes a rocking arm pivotally carried by the frame on a first pivot means for rocking about an axis transverse to the cleaning shoe and the guides are pivotally connected by a second pivot means to the rocking arm and spaced from the first piovtal connection and drive means for oscillating the rocking arms so as to move the guides in a reciprocating arc.

3. The invention defined in claim 2 wherein the first pivot means is disposed downstream of and below the second pivot means so that the general slope of the arcuate movement of the guides is in an upward and downstream direction.

4. The invention defined in claim 2 and further including a first elongated foraminous screen disposed below the upper run of the belt and pivotally connected to the rocking arm by a third pivot means so that oscillation of the rocking arm imparts an oscillation to the screen.

5. The invention defined in claim 4 wherein the third pivot means, with respect to the first pivot means, is remote from the second pivot means so that, instantaneously, the screen and the guides move in opposite directions.

6. The invention defined in claim 4 wherein the first screen extends downstream beyond the downstream roller.

7. The invention defined in claim 1 and further including a fixed guide member carried by the frame for engaging and guiding the lower run of the belt.

8. The invention defined in claim 1 wherein the blower means includes an air passage for conducting air and extending beneath the lower run of the belt.

9. A cleaning shoe for processing crop material received from the threshing and separating mechanisms of a combine harvester comprising:

a frame;

spaced apart upstream and downstream conveyor rollers supported by the frame;

an enlongated endless foraminous belt trained around the rollers so as to define an approximately horizontal upper run and a lower run beneath the upper run, the upper run being disposed so as to receive crop material from the threshing and separating mechanism of the combine;

drive means for rotating at least one of the rollers so that the upper run of the belt moves in a downstream direction;

oscillating means supported by the frame for engaging and agitating a portion of the upper run as the upper run is moving in a downstream direction; and blower means supported by the frame for directing air generally upwards and downstream so that at least a portion of the air passes through the upper and lower runs of the belt and including opposite longitudinally extending blower passages spaced apart and parallel to the opposite sides of the belt and a plurality of transverse air passages connected between them, each transverse air passage having a nozzle disposed so as to provide the upward and downstream movement of air.

10. The invention defined in claim 9 wherein the nozzles extend transversely and substantially span the width of the belt.

11. The invention defined in claim 9 wherein the blower means includes a pair of blower wheels for providing the cleaning air, each blower wheel being connected to one of the opposite longitudinal air passages.

12. The invention defined in claim 9 wherein the transverse air passages are structurally connected to the longitudinal air passages to define a subframe structure and wherein the frame at least partially comprises said subframe structure.

* * * * *